Sept. 16, 1952  J. AMBROSE  2,610,432
INSECTICIDAL POWDER CONTAINER AND DUSTER
Filed May 23, 1949

Inventor
John Ambrose

By *Clarence A. O'Brien and Harvey B. Jacobson*
Attorneys

Patented Sept. 16, 1952

2,610,432

UNITED STATES PATENT OFFICE 2,610,432

INSECTICIDAL POWDER CONTAINER AND DUSTER

John Ambrose, Wind Gap, Pa.

Application May 23, 1949, Serial No. 94,786

2 Claims. (Cl. 43—145)

The present invention relates to a novel and improved dry powder container and duster which is especially, but not necessarily, adapted for use by the man of the house in and around home gardens for conveniently dusting small trees, plants and flowers with an appropriate insecticidal powder, or, for distributing agricultural lime on lawn surfaces.

Needless to say, I am aware that small wheel supported spreader carts are used in residential areas for distributing and spreading grass seeds, lime, and granular fertilizers; that many and varied types of guns, so-called, are provided for shooting insecticidal spray liquids and powders on rose bushes, vegetables and many and varied insect laden plants and flowers. In reducing to practice the present invention I have evolved and produced an unusually simple, economical and efficient powder container which is such that it may be held in one hand and swung back and forth like an oversize powder can, whereby to enable the user to conveniently and effectively perform his gardening chores.

One object of the invention pertains to a powder dusting container which is of general frusto-conical form, the larger end being perforated and the smaller end open for filling purposes and being provided with a readily attachable and detachable closing cap. The arrangement provides a container which when about three-quarters full may be conveniently grasped at the small end and swung in pendulum-style to keep the powder loose and to allow it to be distributed through the perforations in an obvious manner.

Another object is to utilize the smaller truncated end in such a fashion that it may be, figuratively, shoved down into a reserve or supply bucket or sack from which the powder is taken and thus conveniently charged and partially filled with powder in an obvious manner.

Another object of the invention pertains to the use of the stated capped frusto-conical powder sprayer and duster which includes, as another feature, a freely turnable agitator which contributes to the overall success of the container by loosening and keeping the powder loose while it is being dusted about.

Other objects and advantages will become more readily apparent from the following description and the accompanying illustrative drawings.

In the drawings, wherein like numerals are employed to designate like parts throughout the views.

Figure 1:
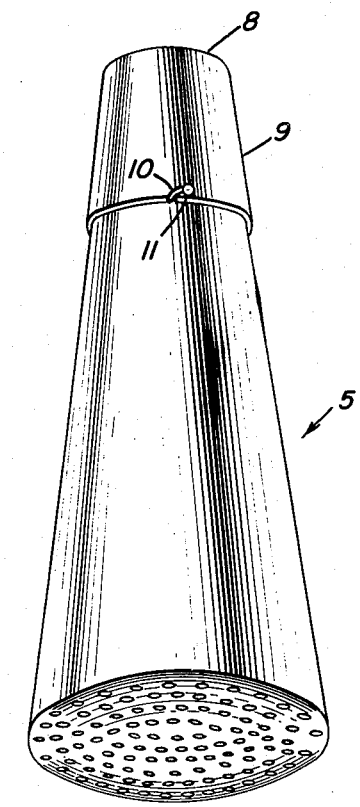
Figure 1 is a perspective view of a powder containing and dusting device constructed in accordance with the principles of the present invention.
Figure 2:
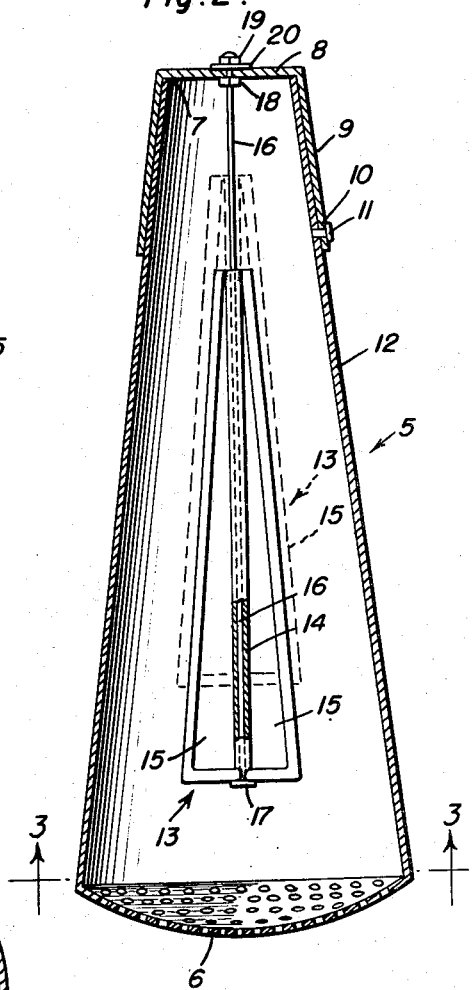
Figure 2 is a enlarged view in section and elevation showing the internal self-acting agitator; and, Figure 3 is a section on the line 3—3 of Figure 2, looking in the direction of the arrows.
Figure 3:
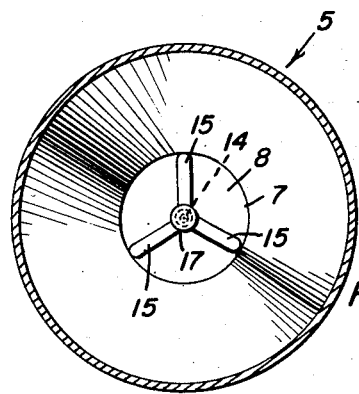

Referring now to the drawings by reference numerals and accompanying lead lines the container, as such, is denoted by the numeral 5 and is of any appropriate lightweight durable material. It is adapted to be held in the user's hand and swung up and down through an arc of three-quarters of a circle or more to keep the powder loose and to keep the air circulating in the container and to allow the powder to expunge itself on the plants for insecticidal dusting purposes. To achieve the desired ends, the container is frusto-conical in form and the larger concavo-convex end is apertured to provide a sifting member 6. The smaller frusto-conical end is denoted at 7 and is closed by a frusto-conical closing cap 8 whose rim portion 9 has a bayonet slot 10 engageable with a headed keeper pin 11 on the container body portion 12.

I call attention now to a gravity actuable freely slidable and turnable agitator 13 which is preferably made from wire and forms an important contributory part of the overall duster. This comprises an openwork beater-like stirrer characterized by a central hub portion 14 having several radial L-shaped beaters or blades attached thereto and radiating therefrom, the latter being denoted by the numerals 15. The hub portion 14 is slidable and turnable on a rod 16 having a retaining head 17 at one end which is spaced from the perforated distributing end of the container. The opposite end of the rod is fastened by an assemblage of nuts 18 and 19 and a washer 20 to the closing cap 8. Thus, we have a rod carried by the cap, the cap being fastened on the container, and the rod serving as an axle or shaft for the freely rotatable and slidable agitator or stirrer unit 13. The latter is of a tapering form so that the beater blades conform somewhat to the general taper of the body 12. The agitator, as the duster is swung up and down and around with the hand of the user, will slide up and down and will turn under forced gravity and motion obtained from the swinging movements, and will thus keep the powder loose so that it will more readily discharge through the distributing holes in the dusting end or head 6.

I have found that by keeping a bucket of lime or other powder handy and by removing the cap and agitator, the small truncated or open end 7 may be thrust vertically down into the powder and the powder will load itself in the main chamber of the container with no difficulty. This powder loading feature is believed to be unique in a powder duster of the hand actuable type.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A readily fillable insecticidal powder container and duster of the class described comprising a relatively long hollow imperforate conical container, the small end thereof being truncated and open and adapted to serve as a filler neck and, in addition, as the sole hand-grip through the medium of which the user may swing and whip the container back and forth in the air, the larger end of said container being of concavo-convex form and provided with perforations for discharging and spraying the powder from the container and to assist in sifting the powder on plants and the like, a readily applicable and removable cap having a rim detachably attached to the open truncated end of said container and serving, when the latter is in use, to close said open end, a rod attached at one end to said cap and extending axially into the powder chamber of the container and terminating in close spaced relation in respect to said concavo-convex end, and a powder agitator mounted for rotation and sliding movement on said rod, said rod and agitator being insertable and removable by way of said truncated end of the container.

2. A readily fillable insecticidal powder container and duster of a size and type adapted to be held in one hand of a user and whipped and otherwise swung in a pendulous fashion comprising a relatively long hollow conical body and having a concavo-convex perforated sifting and distributing member at its large end, the body of said container being imperforate and the small end thereof being truncated and unobstructedly open, a cap having a conical rim fitted telescopically over the correspondingly tapered small end portion of said body and coinciding therewith in providing a neck of a size to be grasped in the hand of the user, said neck being the sole handling and handle means for said body, a rod rigidly attached at one end to said cap and extending axially into said container and terminating in close spaced relationship in respect to the concavo-convex member of said container, and a freely slidable and rotatable stirrer unit embodying a hub portion which is freely rotatable and slidable on said rod, and radial L-shaped stirrer elements having corresponding ends secured to and radiating from one end of said hub and having their opposite ends converging toward the hub, the degrees of convergence of said stirrer elements corresponding to the taper of said body, whereby said stirrer elements are substantially parallel with corresponding portions of the body.

JOHN AMBROSE.

REFERENCES CITED

The following references are of record in the file of this patent:

UNITED STATES PATENTS

| Number | Name | Date |
| --- | --- | --- |
| 156,068 | Searles | Oct. 20, 1874 |
| 455,785 | Adams | July 14, 1891 |
| 1,057,697 | Young | Apr. 1, 1913 |
| 1,243,982 | Rump | Oct. 23, 1917 |
| 1,592,149 | Murden | July 13, 1926 |
| 2,251,903 | Anstice et al. | Aug. 12, 1941 |

FOREIGN PATENTS

| Number | Country | Date |
| --- | --- | --- |
| 125,681 | France | July 27, 1878 |
| 2,241 | Italy | Aug. 5, 1871 |